United States Patent [19]

Podesva et al.

[11] 3,862,139

[45] Jan. 21, 1975

[54] HETEROCYCLIC BENZAMIDE COMPOUNDS

[75] Inventors: Ctirad Podesva; William T. Scott; Milada M. Navratil, all of Montreal, Canada

[73] Assignee: Delmar Chemicals Limited, Quebec, Canada

[22] Filed: June 23, 1972

[21] Appl. No.: 265,804

[52] U.S. Cl... 260/326.47, 260/293.73, 260/293.77, 424/274, 424/267
[51] Int. Cl............................................. C07d 27/04
[58] Field of Search....... 260/326.3, 293.73, 326.47, 260/293.77

[56] References Cited
UNITED STATES PATENTS
3,342,826   9/1967   Miller et al. ......................... 260/294
3,723,416   3/1973   Thominet ..................... 260/239 BF

*Primary Examiner*—Joseph A. Narcavage
*Attorney, Agent, or Firm*—St. Onge, Mayers, Steward & Reens

[57] ABSTRACT

Novel heterocyclic benzamide compounds and pharmaceutical compositions incorporating such compounds in conjunction with orally, parenterally or rectally administrable pharmaceutically acceptable carriers are disclosed. The heterocyclic benzamide compounds have hypotensive and analgesic activity. Also disclosed are processes for preparing these heterocyclic benzamide compounds.

3 Claims, No Drawings

HETEROCYCLIC BENZAMIDE COMPOUNDS

BACKGROUND OF THE INVENTION a. Field of Invention

The present invention relates generally to novel heterocyclic benzamide compounds, to pharmaceutical compositions incorporating such compounds and to processes for preparing such compounds. More particularly, this invention is concerned with heterocyclic benzamide compounds of the following general formula:

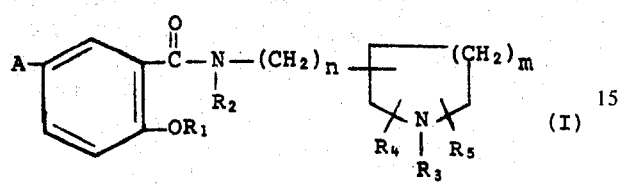

wherein A represents a hydrogen atom, a sulfonic acid group or a chlorosulfonyl group; $R_1$ represents a lower alkyl or lower aralkyl group; $R_2$ represents a hydrogen atom, a lower alkyl or a lower aralkyl group; $R_3$ represents a lower alkyl, lower aralkyl or a substituted amino alkyl group; $R_4$ and $R_5$, which may be the same or different, represent a hydrogen atom or a lower alkyl group; $n$ is 0, 1 or 2 and $m$ is 1 or 2. The invention also contemplates the N-oxides, quaternary ammonium salts and acid addition salts of these heterocyclic compounds. Representative heterocyclic benzamide compounds encompassed by the foregoing general formula I have been found to be biologically active in that they manifest significant analgesic and hypotensive activity. Moreover, those compounds of the foregoing general formula I in which A is a hydrogen atom or a chlorosulfonyl group may be utilized as intermediates in the preparation of a known class of heterocyclic benzamide compounds in which role they provide a novel and highly advantageous route to such compounds.

b. Description of the Prior Art

Canadian Pat. No. 801,043 issued December, 1968 describes a class of heterocyclic benzamide compounds of the following general formula:

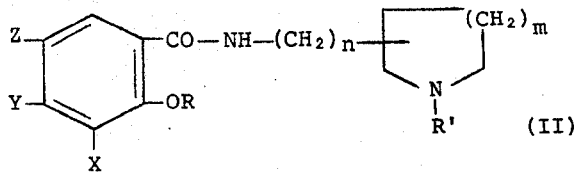

in which R is lower alkyl, X, Y and Z are each hydrogen, halogen, lower alkoxy, nitro, amino, lower alkylamino di(lower alkyl)amino, lower alkylamino, lower acyl, cyano, sulfamoyl, N-lower alkyl sulfamoyl, N,N-di(lower alkyl)sulfamoyl, trihalomethyl, lower alkylthio, lower alkylsulfonyl, polyfluoro-lower-alkylthio, or polyfluoro-lower-alkylsulfonyl, R' is lower alkyl or allyl, $m$ is 1, 2, or 3 and $n$ is 0 or 1.

In the aforementioned patent specification, the heterocyclic benzamide compounds encompassed by the foregoing general formula II are described as being biologically active in that they have utility as antiemetics and in the treatment of mental diseases. Probably the best known of such compounds at the present time is 1-ethyl-2-(2-methoxy-5-sulfamoyl-benzamidomethyl)pyrrolidine, alternatively, N-[(1-ethyl-2-pyrrolidinyl)-methyl]-5-sulfamoyl-o-anisamide, commonly referred to as sulpiride, which is employed in chemotherapy as an antidepressant, antipyretic and antiemetic agent, and more generally as a regulator of the digestive system.

An object of this invention is to provide novel heterocyclic benzamide compounds, not specifically described in the above-mentioned patent specification, and which have quite different pharmacodynamic activity to the benzamide compounds of formula II disclosed in that specification.

Another object of this invention is to provide novel heterocyclic benzamide compounds which are useful as intermediates in the preparation of the known heterocyclic benzamide compounds of formula II.

SUMMARY OF THE INVENTION

According to this invention, in one of its composition of matter aspects, there are provided heterocyclic benzamide compounds having the following general formula:

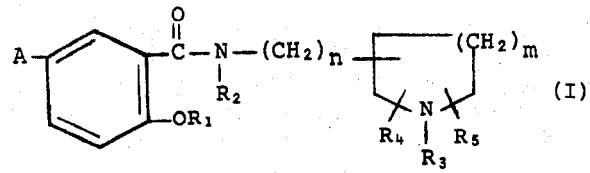

wherein A represents a hydrogen atom, a sulfonic acid group or a chlorosulfonyl group; $R_1$ represents a lower alkyl or lower aralkyl group; $R_2$ represents a hydrogen atom, a lower alkyl or a lower aralkyl group; $R_3$ represents a lower alkyl, lower aralkyl or a substituted amino alkyl group; $R_4$ and $R_5$, which may be the same or different, represent a hydrogen atom or a lower alkyl group; $n$ is 0, 1 or 2 and $m$ is 1 or 2; N-oxides, quaternary ammonium and acid addition salts of such compounds are also included within the scope of this invention. In those instances in which $R_2$ and/or $R_3$ represents a lower aralkyl group, the aryl group, conveniently a phenyl group, may optionally be substituted, for example, by halogen or lower alkyl.

The term "lower" as used herein in relation to alkyl and aralkyl groups connotes an alkyl group containing no more than six carbon atoms.

A highly preferred class of compounds are the 1-lower alkyl-2-(2-lower alkoxy-benzamidomethyl)pyrrolidines such, for example, as 1-ethyl-2-(2-methoxybenzamidomethyl) pyrrolidine, and the salts, particularly acid addition salts thereof. The 5-unsubstituted compounds falling within the scope of the foregoing general formula I have been found to possess hypotensive and analgesic activity when tested pharmacologically by standard, scientifically acceptable procedures in experimental animals such as cats and mice, demonstrating utility in anti-hypertensive therapy and in treatment of various symptoms of pain.

The free bases of this invention, in general, may be either liquids or solids at room temperature. The free bases are, in general, relatively insoluble in water, but soluble in most organic solvents such as lower alkyl alcohols and esters, acetone, chloroform and the like. These compounds form acid addition salts with strong acids, such, for example, as hydrochloric acid, sulfuric acid, perchloric acid and the like. The compounds also form salts with organic acids such, for example, as fumaric and maleic acid. Such salts, in general, are soluble in water, methanol and ethanol, but relatively insoluble in benzene, ether, petroleum ether and the like.

The heterocyclic benzamide compounds of this invention may be made by a number of different processes. And, in this connection, some of the heterocyclic benzamide compounds of the general formula I are obtained through other compounds of the same general formula which, in this context, serve as intermediates in the synthesis of other heterocyclic benzamide compounds of the same general formula.

In a preferred process for preparing those compounds of the general formula I in which A represents hydrogen, i.e., 5-unsubstituted compounds, the appropriate 2-substituted (e.g. lower alkoxy)-benzoic acid is reacted with the appropriate heterocyclic amine in the presence of a carbodiimide derivative, conveniently, dicyclohexyl carbodiimide, as a condensing agent. This process is illustrated as follows:

Route I

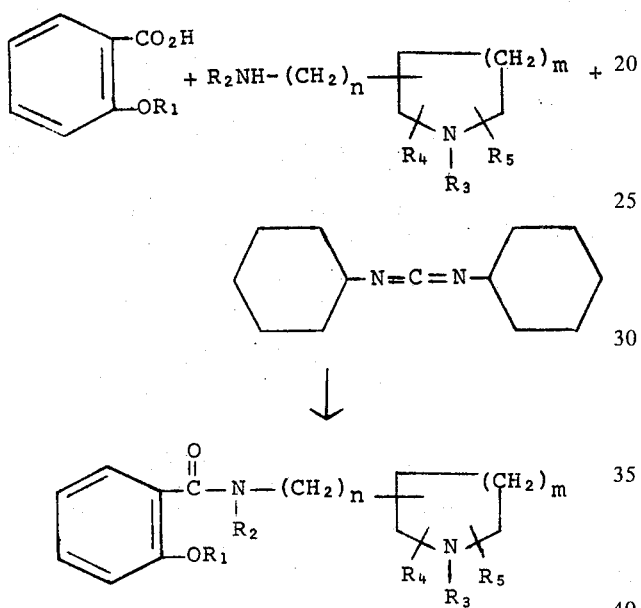

wherein $R_1$, $R_2$, $R_3$, $R_4$, $R_5$, $n$ and $m$ have the same significance as hereinbefore defined. This process is conveniently conducted at a temperature within the range from ambient temperature to 100° C., in an inert organic solvent such, for example, as acetonitrile, tetrahydrofuran, toluene, benzene, ether and the like.

In another preferred procedure for preparing the 5-unsubstituted compounds, the appropriate 2-substituted benzoic acid and the appropriate heterocyclic amine are reacted together in the presence of silicon tetrachloride as the condensing agent. This reaction is illustrated as follows:

Route II

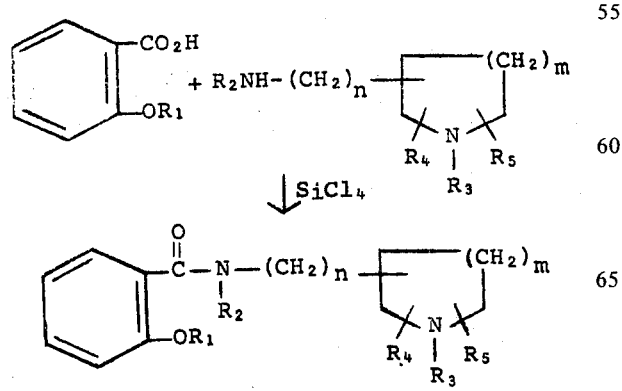

wherein $R_1$, $R_2$, $R_3$, $R_4$, $R_5$, $n$ and $m$ have the same significance as hereinbefore defined. Conveniently, the reactants are mixed in the cold and the reaction conducted at around room temperature. Advantageously, the reaction is conducted in an anhydrous organic solvent such, for example, as pyridine, or a solvent such as benzene or toluene in the presence of an acid binding agent such as triethylamine.

Other less preferred processes are available for the preparation of the 5-unsubstituted compounds. For instance, in one such process, a reactive benzamide derivative is prepared as an intermediate and then reacted with the appropriate heterocyclic amine.

Route III

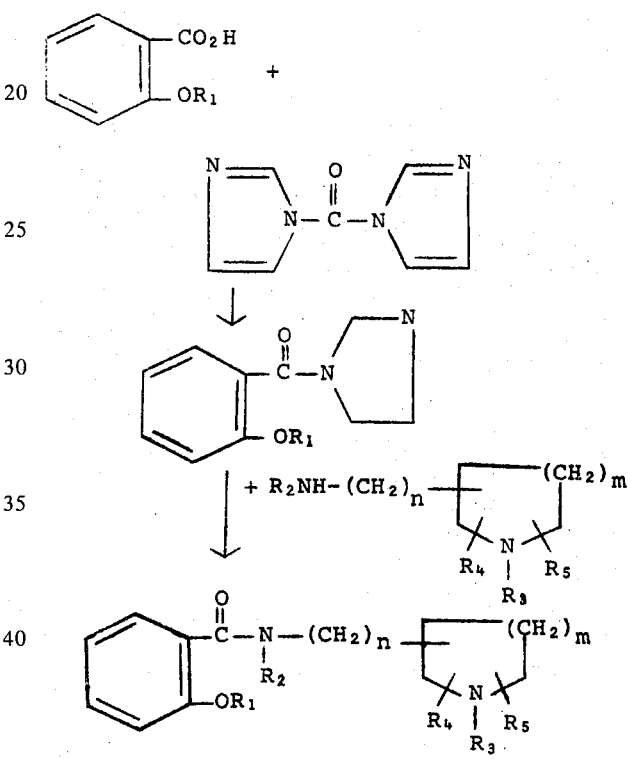

wherein $R_1$, $R_2$, $R_3$, $R_4$, $R_5$, $n$ and $m$ have the same significance as hereinbefore defined.

In another process, the appropriate 2-substituted benzoic acid is esterified in an initial step and subsequently the ester is reacted with the appropriate amine, conveniently in the presence of an aminolysis catalyst such as aluminum isopropoxide as the condensing agent. This process is illustrated as follows:

Route IV

Step a

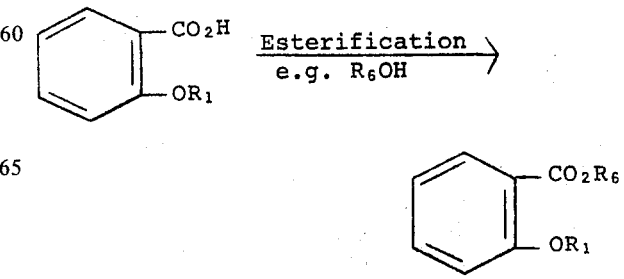

Step *b*

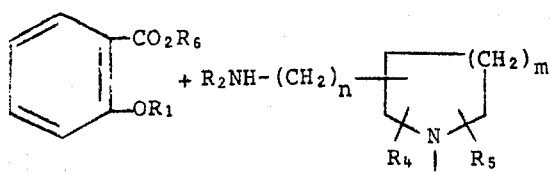

↓ Aminolysis
e.g. Al(isoprop)₃

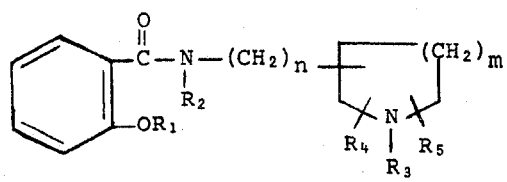

wherein $R_1$, $R_2$, $R_3$, $R_4$, $n$ and $m$ have the same significance as hereinbefore defined and $R_6$ represents a lower alkyl or lower alkaryl group. The esterification of the free acid may be effected by any convenient known method such, for example, as by heating the acid with an excess of a lower alkanol, say, methanol, ethanol or isopropanol in the presence of a mineral acid as a catalyst. The methyl ester formed, for example, by heating the 2-substituted benzoic acid with excess methanol in the presence of concentrated sulfuric acid, is the preferred ester since this is generally associated with the smoothest reaction and best yields in step *b*. However, other esters such, for example, as ethyl, propyl, isopropyl and butyl may be formed, for instance, by reaction of the acid with the corresponding lower alkanol in this reaction step.

The aminolysis reaction of step *b* is conducted in the presence of a suitable catalyst such as aluminum isopropoxide. Advantageously, at least 2 molar equivalents of the amine reactant are employed in the reaction which should be conducted under substantially anhydrous conditions, since water in quite small amounts can deleteriously influence the reaction leading to poor yields. The reaction may be effected simply by heating the two reactants together in the absence of a solvent. Alternatively, an anhydrous organic solvent may be used, for example, a high boiling aromatic solvent such as xylene or toluene in which both reactants are at least partially soluble. Conveniently, this one step reaction is carried out in the presence of a relatively large excess of the amine, say, 6 molar equivalents or more, relative to the ester, so that the amine serves as a solvent as well as a reactant. This reaction is commonly conducted at a temperature of between about 90° to 150° C, say 100° to 120° C. If desired the reaction may be conducted under pressure.

In still another process for preparing the 5-unsubstituted compounds, the appropriate 2-substituted benzoic acid is converted into the corresponding acid halide, say chloride, by reaction with, for example, thionyl chloride or phosphorus pentachloride after which the acid chloride is reacted with the appropriate amine. This process is illustrated as follows:

Route V
Step *a*

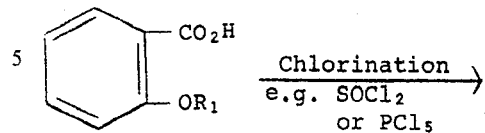

Step *b*

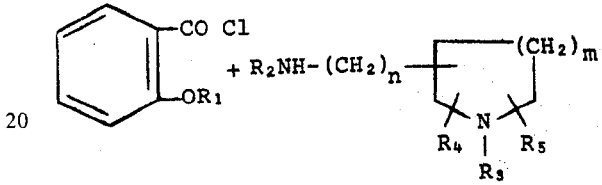

↓ Aminolysis

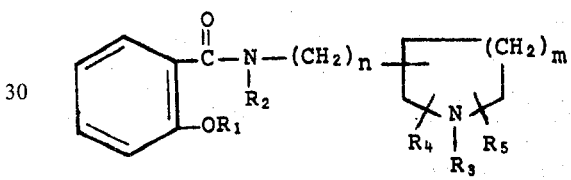

wherein $R_1$, $R_2$, $R_3$, $R_4$, $R_5$, $n$ and $m$ have the same significance as hereinbefore defined.

The 2-substituted benzoic acid compounds, say, 2-methoxy benzoic acid, utilized as one of the starting compounds for the processes (Routes I to V) summarized in the foregoing reaction schemes are known compounds, some of which are available commercially and others may be readily obtained by standard chemical reactions. The heterocyclic amine reactant in these processes are either known in the literature, for example, 1-ethyl-2-aminomethyl pyrrolidine, 1-ethyl-3-amino-piperidine and 1-ethyl-3-aminomethyl piperidine, or may be readily obtained by standard chemical reactions.

To obtain the 5-chlorosulfonyl derivatives of the 5-unsubstituted compounds derived from the processes described in the foregoing, a 5-unsubstituted compound may be treated with chlorosulfonic acid. Conveniently, this chlorosulfonation reaction is conducted by mixing together an excess of chlorosulfonic acid and the desired 5-unsubstituted heterocyclic benzamide compound and then heating the mixture at a temperature, for example, of 100° to 150° C. until the reaction is substantially complete.

The 5-chlorosulfonyl compounds may be converted into the corresponding free-sulfonic acid compounds by hydrolysis of the former.

As indicated previously, the compounds of the foregoing general formula I are useful as intermediates in the synthesis of other heterocyclic benzamide compounds in the form of the corresponding 5-sulfamoyl, N-lower alkyl sulfamoyl and N,N-di(lower alkyl)sulfamoyl derivatives. Many of these compounds are known, having been described in Canadian Pat. No. 801,043 and other prior publications. All may be obtained from the compounds of the general formula I by several novel and advantageous procedures which are more fully described and claimed in the specification of our copending application Ser. No. 265,803 now copending filed concurrently herewith. For instance, when the compound of the foregoing general formula I is in the form of the 5-chlorosulfonyl compound, i.e., A = $SO_2Cl$, this may be converted into the corresponding 5-sulfamoyl, N-lower alkyl sulfamoyl and N,N-di-(lower alkyl)sulfamoyl derivative by ammonolysis with ammonia, or aminolysis with the appropriate primary or secondary amine respectively. Alternatively, when the compound of formula I is in the form of the 5-unsubstituted compound, i.e., A = H, this (in the form of the free base or an acid addition salt) may first be converted into the corresponding 5-chlorosulfonyl compound; subsequently, this compound, which may or may not be isolated according to choice, is converted into the corresponding 5-sulfamoyl, N-lower alkyl sulfamoyl or N,N-di-(lower alkyl)sulfamoyl derivative by ammonolysis or aminolysis as before.

The heterocyclic benzamide compounds of this invention may be converted into N-oxides, quaternary ammonium and acid addition salts by standard procedures. When the compounds are to be used as intermediates for preparing other compounds or for any other non-pharmaceutical use, the toxicity or non-toxicity of the salt is immaterial. When the compounds are to be used as pharmaceuticals, they are most conveniently used in the form of water-soluble, non-toxic acid-addition salts. Both toxic and non-toxic salts are therefore within the purview of the invention. The acids which can be used to prepare the preferred non-toxic acid-addition salts are those which produce, when combined with the free bases, salts whose anions are relatively innocuous to the animal organism in the therapeutic doses of the salts, so that beneficial physiological properties inherent in the free bases are not vitiated by side-effects ascribable to the anions. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, tartaric acid and maleic acid.

The acid addition salts are prepared either by dissolving the free base in an aqueous solution containing the appropriate acid and isolating the salt by evaporating the solution, or by reacting the free base and the selected acid in an organic solvent, in which case the salt separates directly or can be obtained by concentration of the solution.

The following Examples are provided by way of illustrating the preparation of three representative compounds of the present invention. In these Examples, the melting point data was obtained by the capillary tube method.

EXAMPLE 1

1-Ethyl-2-(2-methoxy-benzamidomethyl)pyrrolidine hydrochloride

Part A

A solution comprising 31 gms. (0.182 mole) of 2-methoxy benzoyl chloride dissolved in 157 mls. of methyl ethyl ketone was added slowly over a period of 1 hour to a well stirred solution comprising 23.2 gms. (0.182 mole) of 1-ethyl-2-aminomethyl pyrrolidine dissolved in 22.5 mls. of methyl ethyl ketone maintained at 0° to 5° C. The resulting suspension was stirred at 0° to 5° C. for 6 hours. The white crystalline precipitate which formed was filtered-off and dried at 60° C. The precipitate was recrystallized from methyl ethyl ketone to give 41.1 gms. (yield: 85%) of the desired product.

Melting point: 174° to 176°C.
Elementary analysis

| | C(%) | H(%) | N(%) | Cl(%) |
|---|---|---|---|---|
| Calculated: $C_{15}H_{23}ClN_2O_2$ | 60.29 | 7.75 | 9.37 | 11.86 |
| Found: | 60.53 | 7.65 | 9.56 | 12.05 |

Part B
2-Methoxybenzoyl chloride

The 2-methoxybenzoyl chloride starting compound was obtained as follows:

A mixture comprising 73.4 gms. (0.48 mole) of 2-methoxy benzoic acid and 125.5 gms. (1.05 mole) of thionyl chloride was heated at reflux for 2½ hours. The solution was then cooled and the excess thionyl chloride distilled off under reduced pressure. The residual 0.1 was distilled under reduced pressure to give 71.6 gms. (yield 87.3%) of the desired product in the form of a pale yellow oil.
Boiling point: 95° – 97° C./mm.

EXAMPLE 2

1-Ethyl-2-(2-methoxy-benzamidomethyl)pyrrolidine

1 Gm. (0.006 mole) of silicon tetrachloride was added in small portions to a well-stirred mixture comprising 1.52 gms. (0.01 mole) of α-methoxybenzoic acid and 1.28 gms. (6.01 mole) of 1-ethyl-2-aminomethyl pyrrolidine dissolved in 12 mls. of anhydrous pyridine. The reaction mixture was stirred at room temperature for 16 hours following which it was poured onto 10 gms. of ice. The resulting solution was brought to pH 11 with 10% aqueous sodium hydroxide solution and the alkaline solution extracted with chloroform. The chloroform extracts were washed well with water, dried and evaporated to give 1.9 gms. (yield: 73%) of the desired product in the form of a beige oil. The product was shown to be identical with an authentic sample by thin layer chromatography and comparison of infra-red solution spectra.

EXAMPLE 3

1-Ethyl-2-(2-methoxy-benzamidomethyl)pyrrolidine

A mixture comprising 2.1 gms. (0.012 mole) of methyl 2-methoxybenzoate, 9.6 gms. (0.075 mole) of 1-ethyl-2-aminomethyl pyrrolidine and 0.85 gms. (0.0041 mole) of aluminum isopropoxide was heated at 110° C. for 16 hours. The excess amine was distilled off under reduced pressure and a mixture comprising 5 mls. of concentrated hydrochloric acid and 20 mls. of water was added to the residue. The solution was brought to pH 10 with 30% aqueous sodium hydroxide solution, the fine solid filtered off and the water liquors extracted well with chloroform. The chloroform extracts were washed with water, dried and evaporated to give 2.95 gms. (yield: 90%) of the desired product in the form of a beige oil. This product was shown to be identical with an authentic sample by thin layer chromatography and comparison of infra-red spectra.

EXAMPLE 4

1-Ethyl-2-(2-methoxy-benzamidomethyl)pyrrolidine 2.27 Gms. of N,N'-dicyclohexyl carbodiimide (0.011 mole) were added to a solution comprising 1.52 gms. (0.01 mole) Of 2-methoxybenzoic acid and 1.28 gms. (0.01 mole) of 1-methyl-2-aminomethyl pyrrolidine in 10 mls. of acetronitrile. The resulting solution was stirred at room temperature for 4 hours. The precipitated N,N'-dichlohexylurea was filtered off and the mother liquors evaporated to dryness. The residue was dissolved in chloroform, the solution washed well with water and the chloroform dried and evaporated to leave 2.34 gms. (yield: 90%) of the desired produce in the form of a beige oil. This produce was shown to be identical with an authentic sample by thin layer chromatography and comparison of infra-red solution spectra.

EXAMPLE 5

1-Ethyl-2-(2-methoxy-benzamideomethyl)pyrrolidine 0.64 Gm. (0.0038 mole) silicon tetrachloride was added slowly to a solution comprising 1 gm. (0.0066 mole) o-methoxybenzoic acid, 0.84 gm. (0.066 mole) 1-ethyl-2-aminomethyl pyrrolidine and 2.36 gms. (0.0234 mole) triethylamine in 45 mls. dry benzene at room temperature. The reaction mixture was heated under reflux for 1 ¾ hours, cooled to room temperature and the insoluble materials, consisting of silicon dioxide and triethylamine hydrochloride removed by filtration. The reaction mixture was washed with more benzene, the filtrate and washings were combined and the solvent removed by distillation in vacuo to give 1.6 gms. (yield: 93.5%) of a residue. This produce was shown to be identical with an authentic sample by thin layer chromatography and comparison of infra-red spectra.

Although the preparation of only two specific compounds has been described in the foregoing illustrative Examples, it will be readily understood that other compounds of the general formula I may be obtained following similar procedures.

As indicated hereinbefore, it has been found in accordance with this invention that the novel 5unsubstituted heterocyclic benzamide compounds of the general formula I and salts thereof have interesting biological properties in that such compounds when subjected to standard pharmacological evaluation exhibit hypotensive activity and also analgesic activity. Compounds acting in this way may be expected to be of use in antihypertensive therapy and/or in treating certain symptoms of pain.

Accordingly, this invention further provides, in another of its composition of matter aspects, a pharmaceutical composition comprising as an essential active ingredient at least one active 5-unsubstituted compound of the general formula I or a salt thereof in association with a pharmaceutically acceptable carrier therefor.

The compositions of the present invention are preferably administered either orally or rectally. Advantageously, the composition is in a dosage unit form appropriate to the desired mode of administration. For example, the dosage unit may be a tablet, capsule, pill, powder, packet, granule, wafer, elixir, suppository, or a measured quantity of a suspension, solution, a syrup or segregated multiples of the foregoing. The term "dosage unit form" as used in the specification and claims refers to physically discrete units suitable as unitary dosages for human subjects and animals, each unit containing a predetermined quantity of active material calculated to produce the desired therapeutic effect in admixture, or otherwise in association, with a pharmaceutical carrier therefor, the quantity of the active ingredient being such that one or more units are normally required for a single therapeutic administration or that, in the case of severable units such as scored tablets, at least one fraction such as a half or a quarter of a severable unit is required for a single therapeutic administration.

Advantageously, the compositions of this invention contain the active ingredient in an amount of at least 0.5% and not more than 95% by weight based on the total weight of the composition. Conveniently, the composition of the invention when in dosage unit form contains 0.5 mg. to 1,000 mg., and more conveniently from 5 mg. to 250 mg., of the active ingredient of the general formula I.

The compositions of the present invention will normally consist of at least one 5-unsubstituted compound of formula I, typically in the form of an acid addition, say, hydrochloride or maleate salt thereof admixed with a carrier, or diluted by a carrier, or enclosed or encapsulated by a carrier in the form of a capsule, sachet, catchet, paper or other container. A carrier which serves as a vehicle, excipient or diluent medium for the therapeutically active ingredient may be a solid, semisolid or a sterile liquid.

Some examples of the carriers which may be employed in the pharmaceutical compositions of the invention are lactose, dextrose, sorbitol, mannitol, starches such as wheat, corn, or potatoe starch, gum acacia, calcium phosphate, liquid paraffin, cocoa butter, oil of theobroma, alginates, tragacanth, gelatin, syrup B.P., methyl cellulose, polyoxethylene sorbitan monolaurate, methyl and propyl hydroxybenzoates, pyrogen-free water and substantially isotonic saline solution. The choice of carrier is determined by the preferred form of administration, the solubility of the compound and standard pharmaceutical practice. In the case of tablets, a lubricant may be incorporated to prevent sticking and binding of the powdered ingredients in the dies and on the punch of the tabletting machine. For such purpose, there may be employed, for example, talc, aluminum, magnesium or calcium stereates or polyethylene glycols (Carbowaxes) of suitable molecular weight.

The pharmaceutical compositions of this invention may contain, in addition to the active ingredient of the general formula I (or a salt thereof), one or more other pharmacologically active ingredients which elicit desirable complementary effects.

Two examples of suitable pharmaceutical compositions according to this invention are presented below for the purpose of facilitating a better understanding of this aspect of the invention.

EXAMPLE A

Tablets were made by the procedure described below from a mixture of the following ingredients:
Formulation:

| Ingredient | Content (gms.) |
|---|---|
| 1-Ethyl-2-(2-methoxy-benzamidomethyl)-pyrrolidine hydrochloride | 1000 |
| Starch | 90 |
| Talc | 5 |
| Magnesium stearate | 5 |

Procedure:

The N-[(ethyl-1-pyrrolidinyl-2)methyl]-methoxy-2-benzamide hydrochloride was mixed with 45 gms. of the starch and compressed into slugs. These slugs were reduced to granules by passage through a sieve of aperture size 420$\mu$, the granules were mixed with the remainder of the starch, and the talc and the magnesium stearate were then added. The resultant mixture was compressed into various tablets weighing respectively (a) 55 mg., (b) 137.5 mg., and (c) 275 mg., to provide tablets containing respectively 50, 125 and 250 mg. of the active ingredient.

EXAMPLE B

Capsules were made by the procedure described below from a mixture of the following ingredients:
Formulation:

| Ingredient | Content (gms.) |
|---|---|
| 1-Ethyl-2-(2-methoxy-benzamiodmethyl)-pyrrolidine | 100 |
| Calcium phosphate | 20 |

Procedure:

The two ingredients were thoroughly mixed together and filled into hard gelatin capsules so that each capsule contained 50 mg. of the active ingredient.

In the foregoing Examples A and B, the active ingredient specified may be wholly or partly replaced by another pharmacologically active compound of this invention.

While in the foregoing specification various embodiments of this invention have been set forth and specific details elaborated upon for the purpose of illustration, it will be apparent to those skilled in the art that this invention is susceptible to other embodiments and that many of the details may be varied widely without departing from the spirit and scope of the invention as defined in the appended claims.

What is claimed is:

1. A heterocyclic benzamide compound having the following general formula:

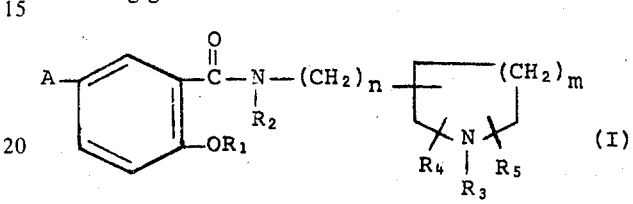

wherein A represents a hydrogen atom; $R_1$ represents a lower alkyl or phenyl-lower alkylene; $R_2$ represents a hydrogen atom, a lower alkyl or a phenyl-lower alkylene; $R_3$ represents a lower alkyl or a phenyl-lower alkylene; $R_4$ and $R_5$, which may be the same or different, represent a hydrogen atom or a lower alkyl group; $n$ is 0, 1 or 2 and $m$ is 1 or 2; and N-oxides, quaternary ammonium and acid addition salts thereof.

2. 1-Lower alkyl-2-(2-lower alkoxy-benzamidomethyl)pyrrolidine or acid addition salts thereof.

3. 1-Ethyl-2-(2-methoxy-benzamidomethyl)pyrrolidine or acid addition salts thereof.

* * * * *